3,196,548
MEASURING DEVICE
Harold C. Moore, 1400 Norman Place,
Warson Woods, Mo.
Filed Feb. 4, 1963, Ser. No. 255,838
8 Claims. (Cl. 33—169)

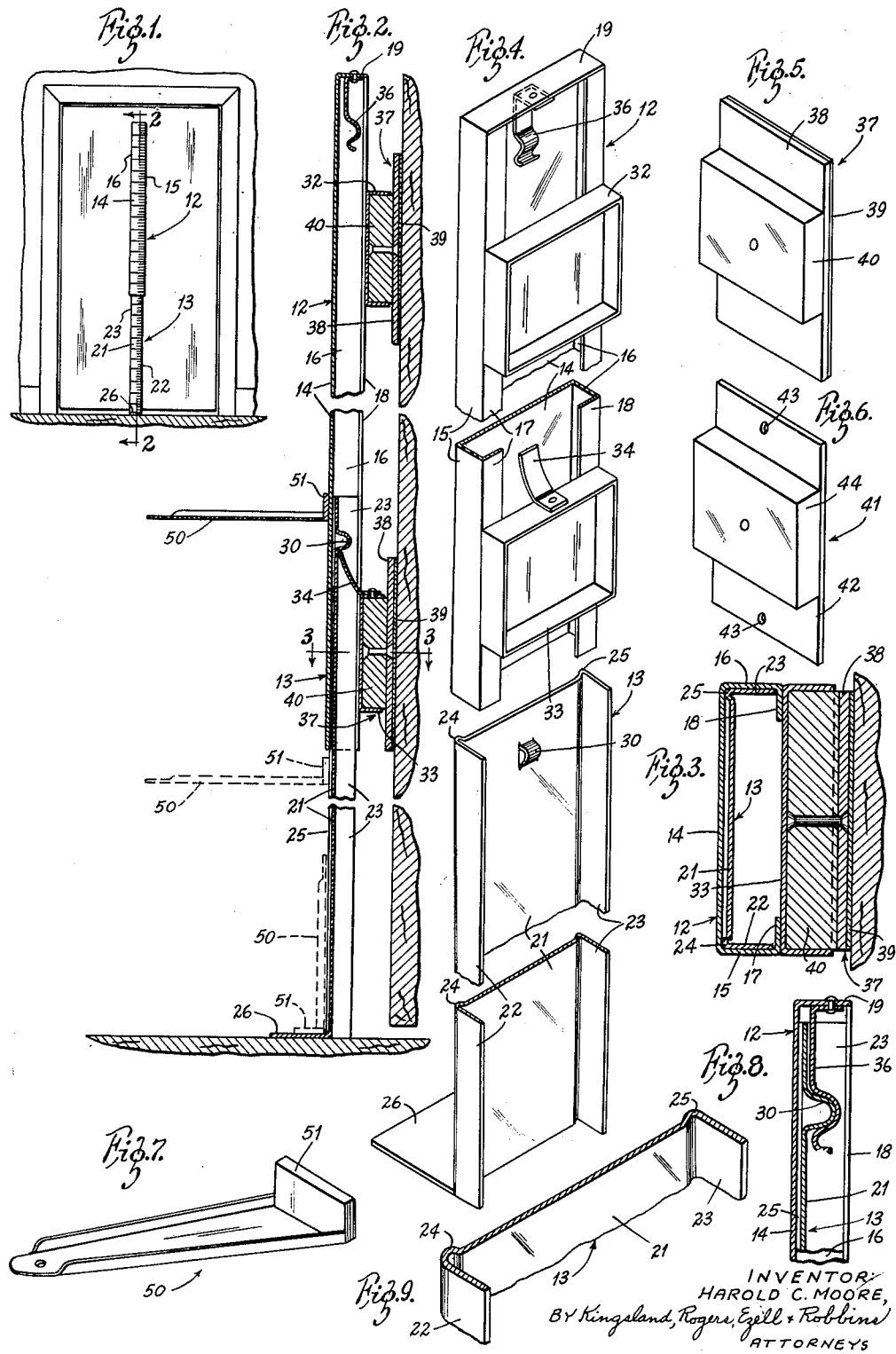

The present invention relates to a device for linear measuring and particularly for such measuring usages as are familiar in the home. Typical uses of the present device are for measuring heights of people, hemline heights, window opening sizes, and the like.

Essentially, the present measuring device comprises graduated, elongated telescopic members, magnetic means to hold the members to a wall or the like for ready removal and attachment, and a magnetically attachable measuring end bar. The telescopic elements may be formed of channel sections and include means releasably to hold them in either retracted or extended relative positions. At least one of them has magnetic elements that can be releasably held by complementary magnetic devices attachable to a wall or other similar surface by screws, adhesive, or the like. It is preferable that the telescopic elements be made of a magnetic material so that the measuring end bar with a magnet attached thereto can be secured in selective position along them by magnetic means.

Objects of the invention include the provision of a measuring device having the features inherent in the foregoing. Specifically, it is an object of the invention to provide a measuring device that can be readily attached and detached from a wall or similar surface, and particularly by magnetic attaching devices so that the parts remaining on the wall are small and inconspicuous and of a pleasing appearance. Further objects include the provision of a measuring device of the foregoing type whereon a measuring bar can be adjustably secured along it by magnetic means so that the measuring bar can easily be positioned at any appropriate measuring place on a graduated scale. Other means include a telescopic measuring device of the foregoing kind which can be readily held in telescopic or extended position. Other objects will appear from the description to follow.

In the drawings:

FIGURE 1 is an elevation of the device in position against a door;

FIGURE 2 is an enlarged vertical medial section taken on the line 2—2 of FIGURE 1;

FIGURE 3 is a further enlarged transverse section taken on the line 3—3 below the middle of FIGURE 2;

FIGURE 4 is an isometric view taken from a rear quarter of the device;

FIGURE 5 is an isometric view of one form of magnetic attaching block;

FIGURE 6 is an isometric view of another form of attaching block;

FIGURE 7 is an isometric view of a cross bar;

FIGURE 8 is an enlarged vertical section of the latching means at the top of FIGURE 2 with the telescopic elements in retracted position; and FIGURE 9 is an enlarged sectional view of a portion of the inner telescopic element.

The device includes an outer telescopic element 12 and an inner telescopic element 13. The outer telescopic element 12 has a front wall 14, side walls 15 and 16, and inturned side flanges 17 and 18 along the edge of the side walls 15 and 16. It has a top flange 19. Its bottom is open.

The inner telescopic member 13 is of channel section with a front wall 21 and side walls 22 and 23. Preferably these side walls merge into the main wall 21 by outwardly projecting beadings 24 and 25. The member 13 has an out-turned foot 26 at the bottom, and a lug 30 near its top pressed out of the wall 21. When the members 12 and 13 are telescoped, the flanges 17 and 18 on the member 12 engage the back edges of the sides 22 and 23 of the member 13, while the beadings 24 and 25 on the member 13 constitute tracks that ride in the channel of the outer member 12 engaging against the back side of the front wall 14 thereof. This should be clear from FIGURES 2, 4 and 9. The beadings aid in preventing binding of the elements and galling that could interfere with easy movement thereof.

The outer telescopic element 12 has permanently attached across its flanges 17 and 18 two box-shaped metal elements 32 and 33, each having four sides and a bottom, these boxes being for a purpose later to appear. The lower box 33 has an upwardly and inwardly projecting leaf spring 34 secured to its top edge, this leaf spring being yieldable outwardly but being normally disposed close to or in contact with the inside wall of the section.

When the inner element 13 is telescoped into the member 12, the lug 30 pressed outwardly from the wall 21, passes under the spring 34. When the telescopic elements are completely retracted, the lug 30, by its curved shape engages under the curved tip of a spring retainer 36 of the shape illustrated in FIGURES 2 and 3. This spring 36 yieldably holds the lug 30 and prevents separation of the two telescopic elements. However, the rounded shapes of the lug 30 and the spring 36 permit them to be pulled apart by application of some force thereto. Also the outwardly projecting end of the spring 36 makes it easy to lift the spring off the lug to permit separation of the elements. The open back of the outer element 12 gives access to the spring 36. When the telescopic elements approach their maximum extended position, the spring 34 engages under the lug 30 in the manner shown in FIGURE 2. In this case, the spring 34 prevents further separation of the two telescopic elements. However, because of the open back of the outer element 12, the spring 34 is accessible to the fingers so that it can be drawn away from the lug to permit the parts to be physically separated if desired.

In order to support the measuring sticks upon a wall or a like surface, magnetic blocks are provided. In FIGURE 5, one magnetic block 37 is illustrated as consisting of a metal plate 38 backed by a layer of adhesive 39 and having a strong magnet 40 attached to its front end as by a rivet. The magnet 40 is of block shape and is designed to fit with modest tolerance into the box 32 or the box 33. The adhesive 39 may be initially covered with a masking sheet if desired, the masking sheet being removed to permit the block to be pressed against a wall to adhere there.

The other supporting block 41 is shown as containing screw holes 43 and a magnetic block 44 attached to the backing plate 42 as by a rivet. In this case, the screw holes 43 can be used to receive screws that will hold the block to the wall. Both the screw holes and the adhesive may be provided for alternative use if desired. The blocks 37 and 41 may be otherwise identical so that either one fits with fairly close tolerance into either box 32 and 33.

As shown particularly in FIGURES 2 and 7, a magnetized measuring bar 50 is provided. It may have a magnetic block 51 in transverse relationship at its inner end. This magnetic block can engage against the face of the telescopic elements 12 and 13, which are of magnetic material such as steel and can slide freely up and down the face of the telescopic elements 12 and 13.

In its collapsed condition the inner telescopic element 13 will be slid into the outer telescopic element 12 as far as it will go. In this action the lug 30, because of its sloping upper edge, snaps under the end of the spring clip 36, releasably retaining the two telescopic elements in such relation. The end bar may be engaged as shown in dotted lines at the bottom of FIGURE 2, wherein the magnetic element 51 attaches onto the foot 26 of the telescopic element. In this position it takes a minimum of space. In shipping or storage, the blocks 37 and 41 may be detached from the wall, and disposed in the boxes 32 and 33 to be tightly held by magnetic action.

When it is desired to install the device, for example as illustrated in FIGURE 1, on a door, the elements 12 and 13 are opened out to the desired height with the blocks 37 and 41 in the boxes 32 and 33. For simplicity of reading the heights, the inner member 13 should be extended all the way until the lug 30 abuts the spring 34. In this position the graduations are continuous from the lower end of the members 13 to the top of the member 12. Then, with the foot 26 resting on the floor, the blocks can be moved against the wall or door, and the location for the blocks 37 and 41 can be marked on the door. Thereafter the two blocks are removed from the boxes 32 and 33 and are fastened to the door at the points indicated, either by the adhesive 39 or by screws or other appropriate fastening means. As soon as the blocks 37 and 41 are located fixedly on the wall or door, all that is necessary for the use of the device is to slip the boxes 32 and 33 over the blocks. The cross bar 50 may be taken out as desired and located at any level above the floor where it can act either to measure the heights of people or hemlines or whatnot.

The two members 12 and 13 are graduated on their outer faces as illustrated in FIGURE 1 preferably in inches and fractions thereof. Conveniently the outer telescopic element 12 may be three feet long, and the inner one may have its projecting length the same.

When a particular measuring operation is completed, the user may simply slide the inner telescopic element 13 upwardly until its lug 30 snaps under the spring 36 where it will be retained out of the way in such manner as not to interfere with the operation of the door or with cleaning the floor. Also the cross head measuring bar 50 may be put back in its storage position against the foot 26.

Or, if desired, the measuring instrument may be pulled from the blocks 38 and 42 and used as a handy household measuring ruler, or stored that way. When it is removed from the blocks, the two elements 12 and 13 cannot separate because of the action of the leaf spring 34 against the bottom of the lug 30.

The measuring stick is also removable from the blocks for use as a detached measuring device for any of the usual purposes. Where more than one cross head measuring bar 50 are supplied, they can be used as is obvious for measuring spans.

As noted, it is preferably to make the entire telescopic elements and boxes out of steel, this being a convenient and in expensive magnetic material. It will, of course, be understood that parts may be made of non-magnetic material provided a sufficient amount of magnetic material is used in the boxes to respond to the magnetic field of the magnets 40 and 44, and enough magnetic material is used on the faces of the telescopic elements to permit the positioning and adherence of the cross head measuring bar 50 thereto.

From the foregoing, it can be seen that a convenient measuring stick has been made which is easy to operate, which can be left in position or taken out of position without interfering with the normal use of the wall or door to which it is applied, which does not deface the wall, and yet which is suitable for all conventional measuring operations. And while it is readily removable from the wall, it is firmly held in place against both vertical and horizontal movements by the confining of the magnets 40 and 44 within the boxes 32 and 33.

Various changes and modifications may be made within the process of this invention as will be readily apparent to those skilled in the art. Such changes and modifications are within the scope and teachings of this invention as defined by the claims appended hereto.

What is claimed is:

1. An elongated measuring stick having graduations therealong; at least a pair of attaching means to hang the stick in vertical position on a wall or the like, and a measuring bar adapted to be attached to and project horizontally from the stick; each attaching means comprising a spaced magnetic block element and a corresponding receptacle element of magnetic material, one element of each pair being on the stick and the other being adapted for attachment to the wall or like support, the receptacle element including portions engageable at the top and opposite sides of the magnetic block, whereby the pair of attaching means can properly position and also support the stick.

2. The measuring device of claim 1, wherein each receptacle element constitutes a four-sided box and the magnet a four-sided block fitting with fairly close tolerances into the box.

3. The measuring device of claim 1, wherein the stick constitutes a channel section element with overhanging flanges, and wherein there is a telescopic element slidably engageable within the channel section and retained therein by the flanges, interengaging latching means between the two elements adapted releasably to hold the elements in retracted and telescoped position and means to prevent separation of the two telescopic elements.

4. The measuring device of claim 3, wherein the inner telescopic element has beads formed in its corners that track against the interior of the channel of the first named stick to reduce friction.

5. The measuring stick of claim 1, wherein there is magnetic material along the stick, and the measuring bar has a magnet device by which it can be supported on the stick.

6. The measuring stick of claim 1, wherein the attaching means elements attached to the wall or like support are the magnetic block elements, and there is adhesive means to attach them.

7. The measuring stick of claim 1, wherein the stick comprises two elongated elements, one telescopic within the other, the outer stick element having a front wall, side walls, and back wall means, and the inner stick element has parts engaging the side walls and back wall means, and also having substantially linear engagement with the inner surface of the front wall.

8. A measuring device comprising two telescopic elements, the first being an outer telescopic element of flanged channel sections open on its back side, the inner telescopic element comprising a channel shaped member with beading formed along its edges, and interfitting into the outer telescopic element and retained therein by the flanges, a lug stamped out of the upper portion of the inner telescopic element, a foot projecting outwardly from the lower end of the inner telescopic element, a spring clip at the upper end of the outer telescopic element accessible through the open back thereof, a retainer spring at the lower end of the outer telescopic element accessible at the outer end thereof, the spring clip projecting forwardly toward the web of the channel section of the outer member, the inner member when telescoped within the outer telescopic element causing the lug thereon to be engageable under the spring clip when the members are retracted and to be retained against the retainer spring when the members are extended, a pair of box-like elements of magnetic material attached across the flanges of the outer telescopic elements and open backwardly, a pair of magnetic block attaching devices each having a magnet engageable with fairly close tolerance into one of the open boxes on the outer telescopic element and each having a plate to which the magnetic block is attached, the plate having means for being attached to a wall or like surface, and a cross head measuring bar having a magnetic element thereon for selective positioning along the two telescopic elements, with graduations on the front faces of the two telescopic elements.

References Cited by the Examiner

UNITED STATES PATENTS

| | | |
|---|---|---|
| 1,985,527 | 12/34 | Taylor. |
| 2,324,334 | 7/43 | Sutton _____ 33—169 |
| 2,337,248 | 12/43 | Koller _____ 33 |
| 2,521,885 | 9/50 | Vasquez _____ 292—251.5 |
| 2,731,663 | 1/56 | Thompson _____ 292—25.15 |
| 2,742,250 | 4/56 | Cronberger _____ 248—206 |
| 2,901,278 | 8/59 | Robinson _____ 292—251.5 |

FOREIGN PATENTS 133,345   8/02   Germany.

ISAAC LISANN, *Primary Examiner*.